US011950049B2

(12) United States Patent
Hayasaka et al.

(10) Patent No.: US 11,950,049 B2
(45) Date of Patent: Apr. 2, 2024

(54) ACOUSTIC REFLECTOR, SPEAKER UNIT, AND CHAIR

(71) Applicant: SONY GROUP CORPORATION, Tokyo (JP)

(72) Inventors: Takahiro Hayasaka, Tokyo (JP); Daisaku Matsufuji, Tokyo (JP); Tsutomu Toyoguchi, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 128 days.

(21) Appl. No.: 17/608,554

(22) PCT Filed: Mar. 26, 2020

(86) PCT No.: PCT/JP2020/013641
§ 371 (c)(1),
(2) Date: Nov. 3, 2021

(87) PCT Pub. No.: WO2020/230462
PCT Pub. Date: Nov. 19, 2020

(65) Prior Publication Data

US 2022/0225018 A1 Jul. 14, 2022

(30) Foreign Application Priority Data

May 13, 2019 (JP) ................................ 2019-090786

(51) Int. Cl.
*H04R 1/34* (2006.01)
*H04R 1/02* (2006.01)
*A47C 7/72* (2006.01)

(52) U.S. Cl.
CPC ............ *H04R 1/345* (2013.01); *H04R 1/025* (2013.01); *A47C 7/727* (2018.08)

(58) Field of Classification Search
CPC ........ H04R 1/345; H04R 1/025; H04R 5/023; H04R 2499/13; A47C 7/727
See application file for complete search history.

(56) References Cited

U.S. PATENT DOCUMENTS 2,643,727 A * 6/1953 Leon ..................... H04R 1/345 181/155
5,268,539 A 12/1993 Ono
(Continued)

FOREIGN PATENT DOCUMENTS

CN 101888580 A 11/2010
CN 109070782 A 12/2018
(Continued)

OTHER PUBLICATIONS

Extended European Search Report of EP Application No. 20805245.6, dated Jun. 7, 2022, 11 pages.
(Continued)

*Primary Examiner* — Oyesola C Ojo
(74) *Attorney, Agent, or Firm* — CHIP LAW GROUP

(57) ABSTRACT

An acoustic reflector includes a reflection portion on which an elliptical reflection surface is formed, in which sound output from a speaker device that has an output position of the sound at or near one focal point on the elliptical reflection surface is reflected by the elliptical reflection surface, and the reflection portion has a size that reflects sound in a range of equal to or less than a nominal directional angle of the speaker device. As a result, because an outer shape of the reflection portion is formed to have a size in the range corresponding to the nominal directional angle of the speaker device, it is possible to reduce the size of the acoustic reflector.

9 Claims, 15 Drawing Sheets

(56) References Cited

U.S. PATENT DOCUMENTS

| | | | | |
|---|---|---|---|---|
| 5,850,060 | A | 12/1998 | Gerber et al. | |
| 6,820,718 | B2 * | 11/2004 | LaCarrubba | G10K 11/20 381/160 |
| 9,560,442 | B2 * | 1/2017 | O'Polka | G10K 11/28 |
| 10,721,554 | B2 * | 7/2020 | Groleau | B60N 2/879 |
| 11,299,080 | B2 * | 4/2022 | Oswald | B60R 11/0217 |
| 11,336,976 | B2 * | 5/2022 | Subat | H04R 1/023 |
| 2004/0231911 | A1 | 11/2004 | Welker et al. | |
| 2010/0290659 | A1 * | 11/2010 | Tagami | H04R 1/345 381/352 |
| 2011/0081038 | A1 | 4/2011 | Tracy | |
| 2012/0281867 | A1 | 11/2012 | Tracy | |
| 2013/0140862 | A1 * | 6/2013 | Silzle | H04R 1/323 297/217.5 |
| 2017/0267138 | A1 * | 9/2017 | Subat | B60N 2/0244 |
| 2018/0035185 | A1 * | 2/2018 | Fujita | A47C 7/38 |

FOREIGN PATENT DOCUMENTS

| | | | | | |
|---|---|---|---|---|---|
| EP | 0411671 | A2 | | 2/1991 | |
| EP | 3414127 | A1 | | 12/2018 | |
| JP | 61-082712 | A | | 4/1986 | |
| JP | 61082712 | A | * | 4/1986 | B60N 2/4876 |
| JP | 03-49398 | A | | 3/1991 | |
| JP | 03-128599 | A | | 5/1991 | |
| JP | 03-132198 | A | | 6/1991 | |
| JP | 05-207584 | A | | 8/1993 | |
| JP | 07-288885 | A | | 10/1995 | |
| JP | 11-041688 | A | | 2/1999 | |
| JP | 2005-167379 | A | | 6/2005 | |
| JP | 2005161898 | A | * | 6/2005 | B60R 11/02 |
| JP | 2010-268018 | A | | 11/2010 | |
| WO | 2017/160594 | A1 | | 9/2017 | |
| WO | 2019/038915 | A1 | | 2/2019 | |
| WO | WO-2019038915 | A1 | * | 2/2019 | H04R 1/00 |

OTHER PUBLICATIONS

International Search Report and Written Opinion of PCT Application No. PCT/JP2020/013641, dated Jun. 16, 2020, 11 pages of ISRWO.

* cited by examiner

ACOUSTIC REFLECTOR, SPEAKER UNIT, AND CHAIR

CROSS REFERENCE TO RELATED APPLICATIONS

This application is a U.S. National Phase of International Patent Application No. PCT/JP2020/013641 filed on Mar. 26, 2020, which claims priority benefit of Japanese Patent Application No. JP 2019-090786 filed in the Japan Patent Office on May 13, 2019. Each of the above-referenced applications is hereby incorporated herein by reference in its entirety.

TECHNICAL FIELD

The present technology relates to a technical field of an acoustic reflector including a reflection portion that reflects sound, a speaker unit, and a chair.

BACKGROUND ART

There is a speaker unit that has a configuration that reflects sound output from a speaker device by an elliptical reflection surface and forms a virtual sound source, and is recognized as a configuration in which sound is output from the virtual sound source (for example, refer to Patent Document 1).

The speaker unit described in Patent Document 1 has a configuration in which a reflection portion (ellipsoid) having an elliptical reflection surface is formed in a semi-ellipsoid shape, an output position of sound from the speaker device exists at one focal point of the elliptical reflection surface, and the sound output from the output position is reflected by the elliptical reflection surface so that a virtual sound source is formed at another focal point on the elliptical reflection surface.

A user recognizes as if the sound is output from the virtual sound source, and the sound output from the virtual sound source can be listened as sound similar to that in a state where a sound output surface of the speaker device faces a side of the user.

CITATION LIST

Patent Document

Patent Document 1: Japanese Patent Application Laid-Open No. 2010-268018

SUMMARY OF THE INVENTION

Problems to be Solved by the Invention

Meanwhile, in the speaker unit that has the configuration that forms the virtual sound source using the semi-ellipsoid having the elliptical reflection surface as described in Patent Document 1, the entire size is determined according to a distance between two focal points of the semi-ellipsoid, and in a case where the distance between the two focal points corresponding to a position of a real sound source and a position of the virtual sound source is large, the entire size increases accordingly.

Therefore, an object of an acoustic reflector, a speaker unit, and a chair according to the present technology is to reduce a size of the acoustic reflector that has a configuration including an elliptical reflection surface.

Solutions to Problems

First, an acoustic reflector according to the present technology includes a reflection portion on which an elliptical reflection surface is formed, in which sound output from a speaker device that has an output position of the sound at or near one focal point on the elliptical reflection surface is reflected by the elliptical reflection surface, and the reflection portion has a size that reflects sound in a range of equal to or less than a nominal directional angle of the speaker device.

As a result, an outer shape of the reflection portion is formed to have a size of a range corresponding to the nominal directional angle of the speaker device.

Second, in the acoustic reflector described above, it is desirable that the reflection portion have a size that reflects sound in a range of equal to or less than an effective directional angle.

As a result, the outer shape of the reflection portion has a size that reflects sound in a range of equal to or less than the effective directional angle that is an angle smaller than the nominal directional angle.

Third, in the acoustic reflector described above, it is desirable that the reflection portion have a size that reflects sound in a range where a directional angle is equal to or less than 90 degrees.

As a result, the outer shape of the reflection portion has a size that reflects sound in a range in which the directional angle is equal to or less than 90 degrees.

Fourth, in the acoustic reflector described above, it is desirable that the reflection portion includes a transparent material.

As a result, a feeling of pressure of a user is reduced in a state where the acoustic reflector is positioned near the head at the time of use.

Fifth, in the acoustic reflector described above, it is desirable that the acoustic reflector be movable between a use position where sound output from the speaker device is listened and a retreat position positioned apart from an ear than the use position.

This makes it possible to move the acoustic reflector from the use position to the retreat position when sound is not listened.

Sixth, it is desirable that the acoustic reflector described above include a supported portion connected to the reflection portion and supported by a predetermined support, in which a turning fulcrum portion is provided in the supported portion, and the acoustic reflector is turnably supported by the support using the turning fulcrum portion as a fulcrum.

As a result, the acoustic reflector is turned so as to move between the use position and the retreat position.

Seventh, in the acoustic reflector described above, it is desirable that an adjustment member that adjusts a position of the reflection portion with respect to the support at the use position be provided.

As a result, it is possible to adjust the portion of the reflection portion with respect to the support by the adjustment member.

Eighth, in the acoustic reflector described above, it is desirable that an adjustment screw that is rotatably supported by the supported portion be provided as the adjustment member, and a front end of the adjustment screw be pressed against a part of the speaker device at the use position.

As a result, the position of the reflection portion with respect to the reflection portion at the use position is adjusted by pressing the front end of the adjustment screw rotated with respect to the supported portion against a part of the speaker device.

Ninth, in the acoustic reflector described above, it is desirable that a biasing spring be provided that performs biasing to a direction opposite to the retreat position at the use position and performs biasing to a direction opposite to the use position at the retreat position.

As a result, the movement of the acoustic reflector toward the retreat position is restricted by the biasing spring at the use position, and the movement of the acoustic reflector toward the use position is restricted at the retreat position.

Tenth, in the acoustic reflector described above, it is desirable that the acoustic reflector be supported by a headrest on a seating portion that includes the headrest that is vertically movable with respect to a backrest that functions as a backrest.

As a result, by vertically moving the headrest with respect to the backrest according to a physical size of a user who sits on the seating portion, it is possible to adjust the position of the acoustic reflector according to the position of the user with respect to the seating portion and the physical size of the user.

Eleventh, a speaker unit according to the present technology includes an acoustic reflector that includes a reflection portion on which an elliptical reflection surface is formed and a speaker device that has an output position of sound at or near one focal point on the elliptical reflection surface, in which sound output from the speaker device is reflected by the elliptical reflection surface, and the reflection portion has a size that reflects sound in a range of equal to or less than a nominal directional angle of the speaker device.

As a result, an outer shape of the reflection portion of the acoustic reflector is formed to have a size of a range corresponding to the nominal directional angle of the speaker device.

Twelfth, a chair according to the present technology includes an acoustic reflector that includes a reflection portion on which an elliptical reflection surface is formed, a speaker device that has an output position of sound at or near one focal point on the elliptical reflection surface, and a seating portion to which the speaker device is attached, in which the acoustic reflector is supported by the seating portion, sound output from the speaker device is reflected by the elliptical reflection surface, and the reflection portion has a size that reflects sound in a range of equal to or less than a nominal directional angle of the speaker device.

As a result, an outer shape of the reflection portion of the acoustic reflector is formed to have a size of a range corresponding to the nominal directional angle of the speaker device.

BRIEF DESCRIPTION OF DRAWINGS

FIG. 1 is a perspective view of the chair.

MODE FOR CARRYING OUT THE INVENTION

Hereinafter, modes for carrying out an acoustic reflector, a speaker unit, and a chair according to the present technology will be described with reference to the accompanying drawings.

Note that the acoustic reflector described below is supported by a side surface portion of a headrest of the chair, and the speaker unit is similarly attached to the headrest. In the following description, the forward, backward, upward, downward, rightward and leftward directions in a state where a user sits on the chair are illustrated.

However, the forward, backward, upward, downward, rightward, and leftward directions are indicated below for convenience of the description, and the directions are not limited to those when the present technology is carried out.

<Schematic Configuration of Chair>

First, a schematic configuration of a chair 80 will be described (refer to FIGS. 1 to 4).

Figure 1:
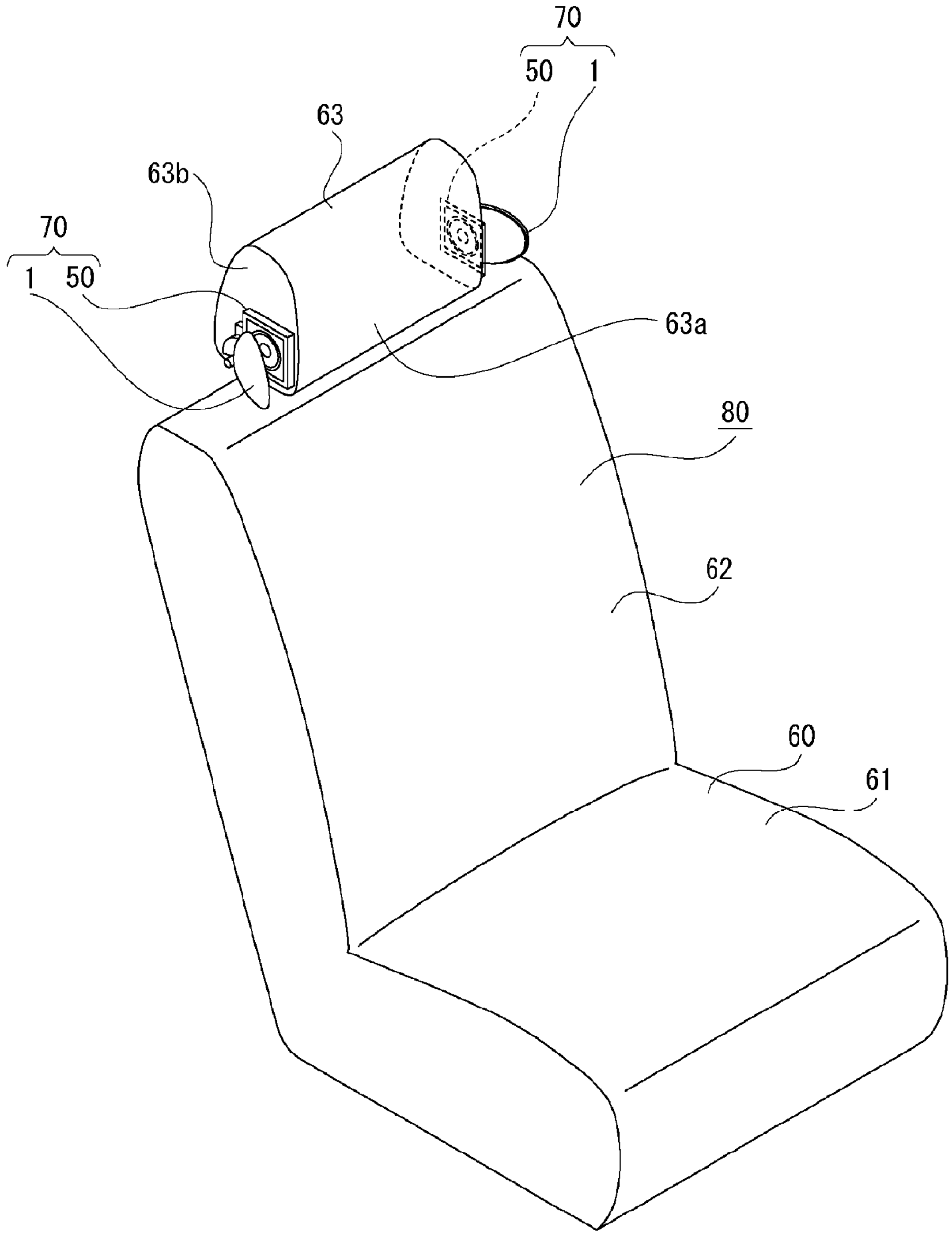
FIG. 1 illustrates an embodiment of an acoustic reflector, a speaker unit, and a chair according to the present technology together with FIGS. 2 to 17.
Figure 2:
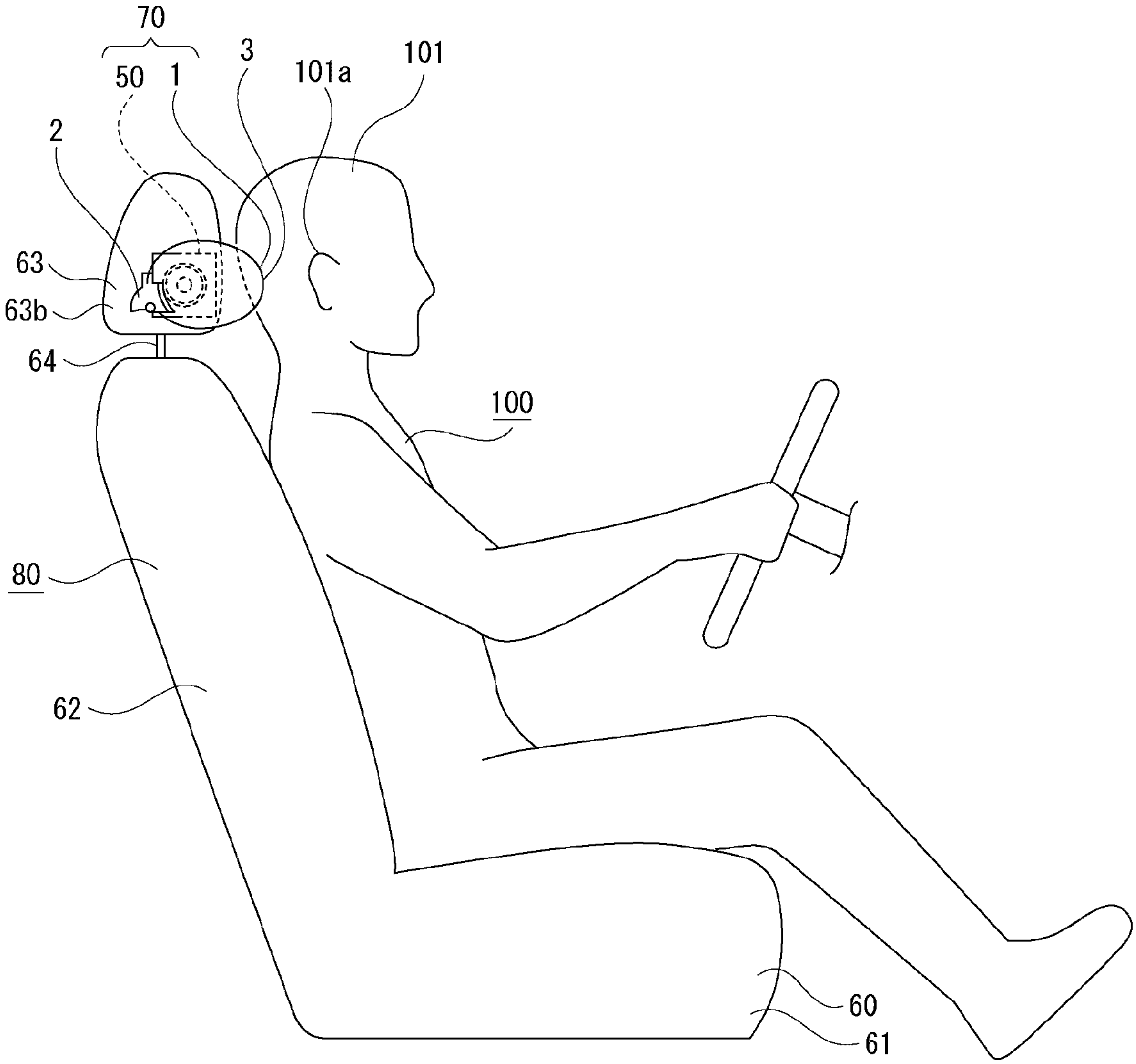
FIG. 2 is a side view illustrating the chair in a state where a user sits on a seating portion.

The chair 80 is used, for example, as a seat in a traveling vehicle such as an automobile (refer to FIGS. 1 and 2). However, the chair 80 is not limited to the seat of the traveling vehicle and may be another chair such as a chair used with an accompanying table or the like in a house or a sofa used in a living room or the like. Furthermore, the chair 80 may be, for example, a chair on which a user sits when the user plays a game, a chair for massage, a chair on which a user sits when the user watches a movie in a movie theater or the like, a chair on which a user sits when the user watches a play or the like in a theater or the like, a chair on which a user sits when the user watches sports in a stadium or the like, or a chair in a traveling vehicle such as an aircraft, a ship, a railway, or the like other than an automobile.

The chair 80 includes a seating portion 60, speaker devices 50 and 50, and acoustic reflectors 1 and 1, and the speaker devices 50 and 50 are attached to the seating portion 60. The acoustic reflectors 1 and 1 are supported by the seating portion 60, for example, in a rotatable state. The speaker device 50 and the acoustic reflector 1 constitute a speaker unit 70.

The seating portion 60 includes a seat 61 where a user 100 sits, a backrest 62 that functions as a backrest, and a headrest 63 where a head 101 of the user 100 is placed from the front side. The headrest 63 is positioned on the upper side of the backrest 62 and is coupled to the backrest 62 with supporting shafts 64 and 64. Upper ends of the supporting shafts 64 and 64 are fixed to, for example, the headrest 63.

In the chair 80, the speaker devices 50 and 50 are attached to, for example, the headrest 63, and the acoustic reflectors 1 and 1 are supported by, for example, the headrest 63. Therefore, the headrest 63 functions as a support that supports the acoustic reflectors 1 and 1.

The headrest 63 is vertically movable, for example, with respect to the backrest 62. The headrest 63 is vertically moved by changing an upward projection amount of the supporting shafts 64 and 64 from the backrest 62, and the position of the headrest 63 can be adjusted with respect to the head 101 by vertically moving the headrest 63 with respect to the backrest 62. The speaker devices 50 and 50 are attached to the headrest 63, and the acoustic reflectors 1 and 1 are supported by the headrest 63. Therefore, the speaker devices 50 and 50 and the acoustic reflectors 1 and 1 are moved upward or downward according to the vertical movement of the headrest 63 with respect to the backrest 62.

Note that the headrest 63 may be tiltable with respect to the backrest 62 or may be vertically movable and tiltable with respect to the backrest 62.

The headrest 63 includes a front surface portion **63*a* on which the head 101 is placed and side surface portions 63*b* and 63*b* connected to both of the left and right edges of the front surface portion 63*a* (refer to FIGS. 1 to 4). From the side surface portions 63*b* and 63*b* of the headrest 63, spring hanging shafts 65 and 65** are respectively laterally (outward) projected.

Figure 3:
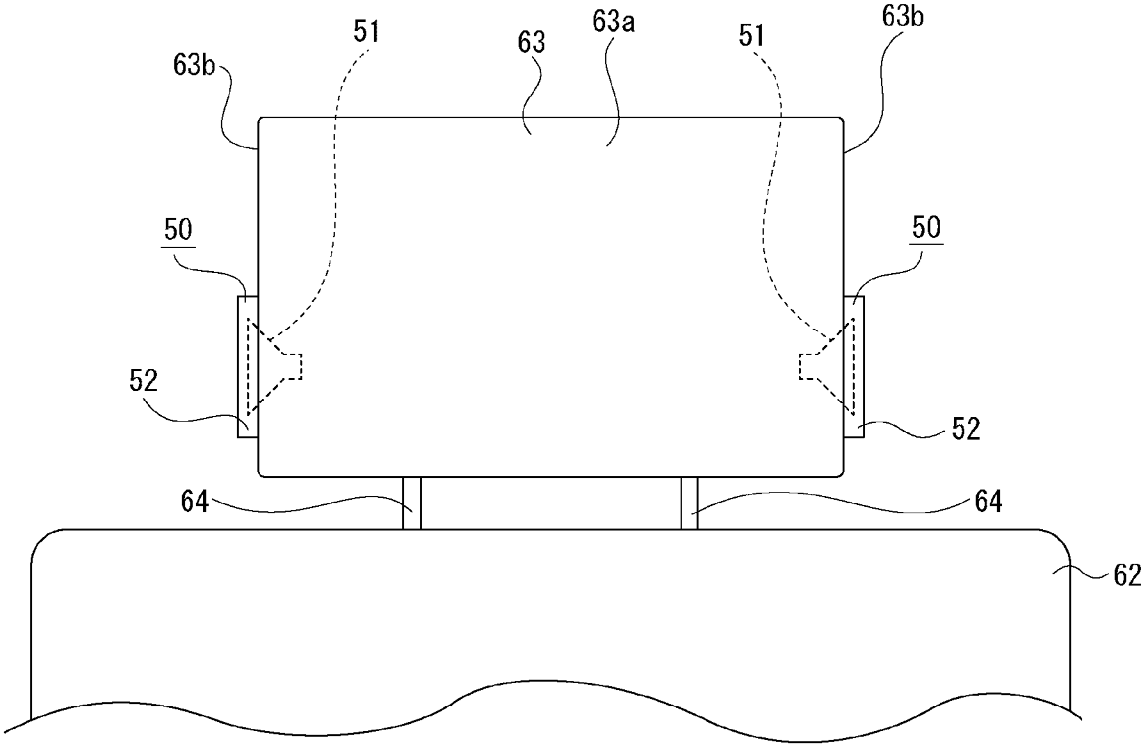
FIG. 3 is a front view illustrating a headrest and a speaker device.
Figure 4:
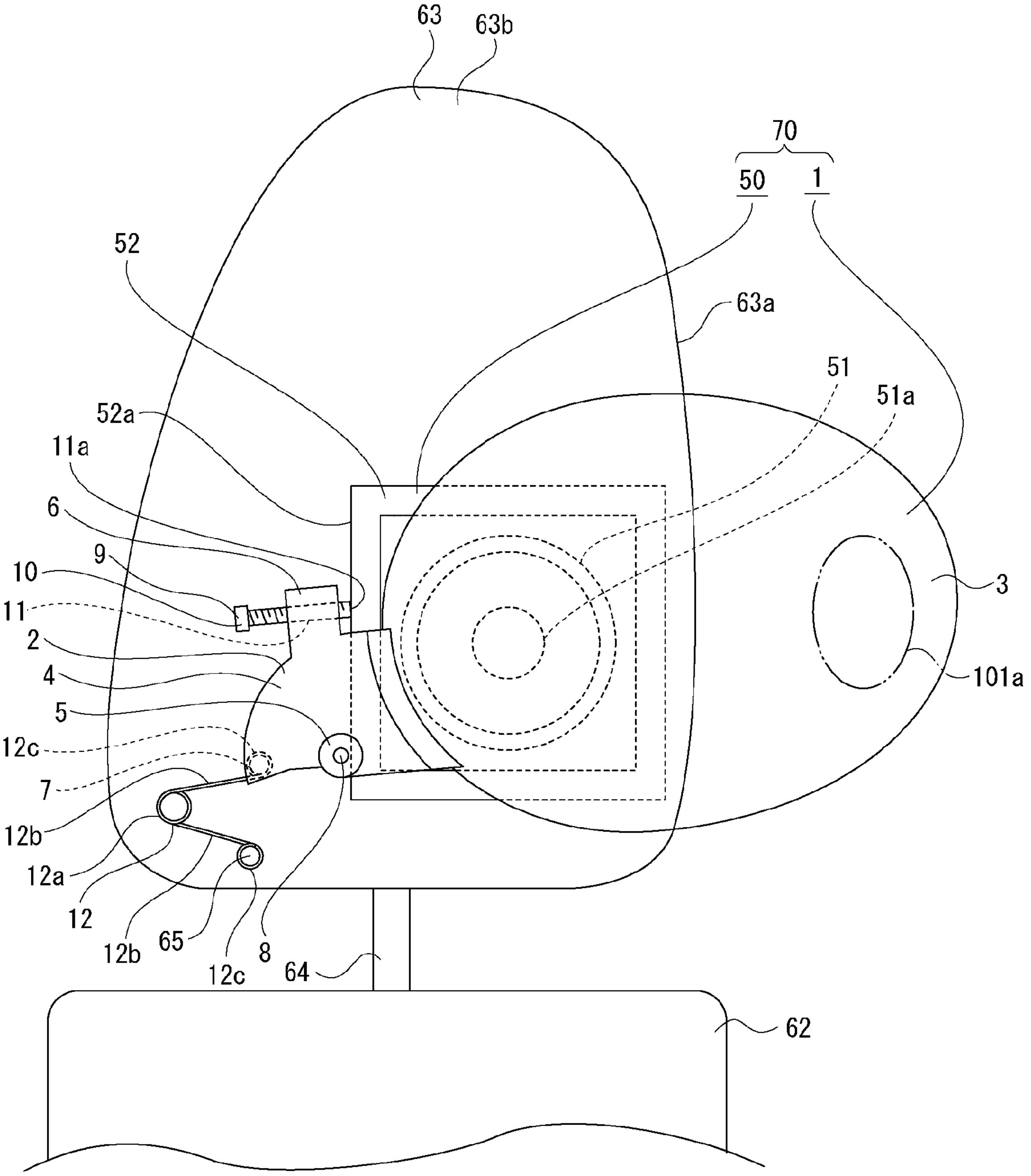
FIG. 4 is a side view illustrating a state where the acoustic reflector is supported by the headrest.

For example, the speaker devices 50 and 50 except for a part are attached as being respectively embedded in the headrests 63 and 63 and are arranged in a symmetrical manner (refer to FIG. 3). The speaker device 50 functions as a real sound source that outputs sounds and includes a main body 51 including each unit used to output sound and a frame 52 attached to the main body 51.

The main body 51 includes each unit such as a magnetic circuit, a diaphragm **51*a*, or the like, and the diaphragm 51*a* is positioned at an output position of sound. The frame 52 is, for example, attached to the main body 51 in a state where the frame 52 is positioned around the diaphragm 51*a* and is formed, for example, in a rectangular shape (refer to FIGS. 3 and 4**).

In a state where the speaker device 50 is attached to the headrest 63, the frame 52 is portioned outside (side) of the side surface portion **63*b* (refer to FIG. 3). A rear surface of an outer peripheral surface of the frame 52 is formed as a receiving surface 52*a* (refer to FIG. 4**).

<Directional Angle of Speaker Device>

Figure 5:
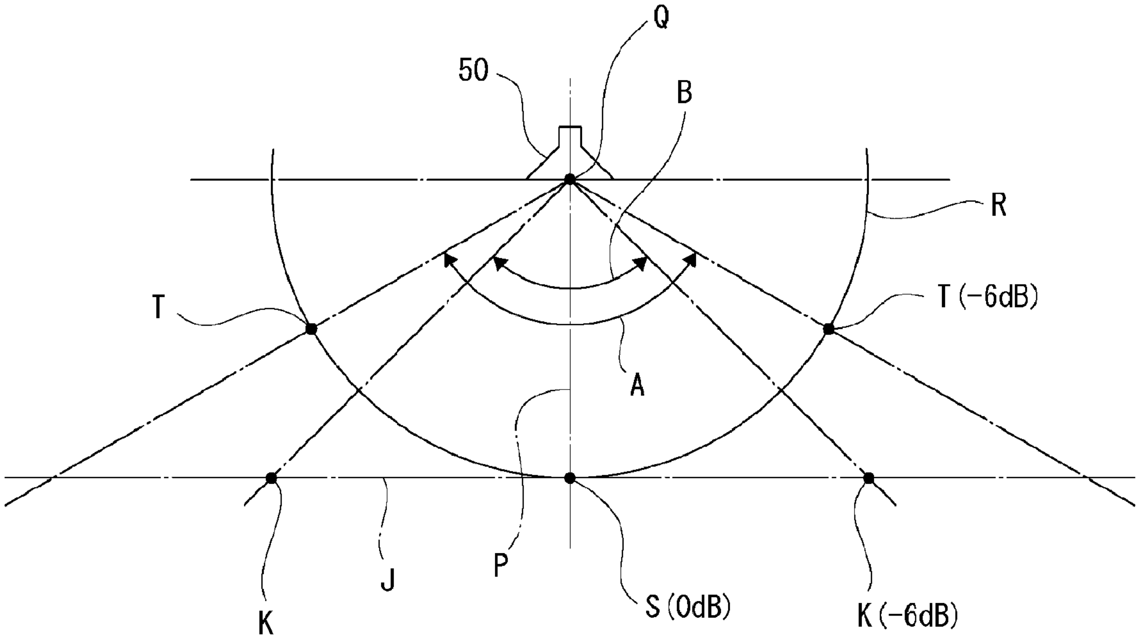
FIG. 5 is a diagram for explaining a directional angle of the speaker device.

Next, a directional angle of the speaker device 50 will be described (refer to FIG. 5).

In general, a nominal directional angle of a speaker device can be obtained by measuring a sound pressure level on a circumference of 360 degrees when a constant electrical input is applied.

The nominal directional angle of the speaker device is "an opening angle when a sound pressure decreases with respect to a sound pressure level on the axis by six dBSPL (absolute value)" when it is assumed that a sound output direction from the speaker device be a direction of an axis P and a sound pressure level on a circumference R around an output position Q is measured. When it is assumed that a point intersecting with the axis P on the circumference R be set as a reference point S and a sound pressure at the reference point S be set to zero dB, points T and T at which a sound pressure decreases with respect to the sound pressure level of the reference point S on the circumference R by six dBSPL are measured, an angle between the points T and T sandwiching the reference point S therebetween is set as a nominal directional angle A, and the nominal directional angle A is an angle smaller than 180 degrees. The nominal directional angle A of the speaker device 50 is, for example, 120 degrees.

On the other hand, in general, an effective directional angle of the speaker device can be obtained by measuring a sound pressure level on a sound receiving surface when a constant electrical input is applied.

The effective directional angle of the speaker device is "an opening angle when a sound pressure decreases with respect to a sound pressure level on the axis by six dBSPL (absolute value)" when it is assumed that the sound output direction from the speaker device be a direction of the axis P and a sound pressure level on a sound receiving surface J is measured. When it is assumed that a point intersecting with the axis P on the sound receiving surface J be set as the reference point S and a sound pressure at the reference point S be set to zero dB, points K and K at which a sound pressure decreases with respect to the sound pressure level of the reference point S on the sound receiving surface J by six dBSPL are measured, an angle between the points K and K sandwiching the reference point S therebetween is set as an effective directional angle B, and the effective directional angle B is an angle smaller than the nominal directional angle A. The effective directional angle B of the speaker device 50 is, for example, 90 degrees.

<Configuration of Acoustic Reflector>

Next, a configuration of the acoustic reflector 1 will be described (refer to FIGS. 6 to 11).

Figure 6:
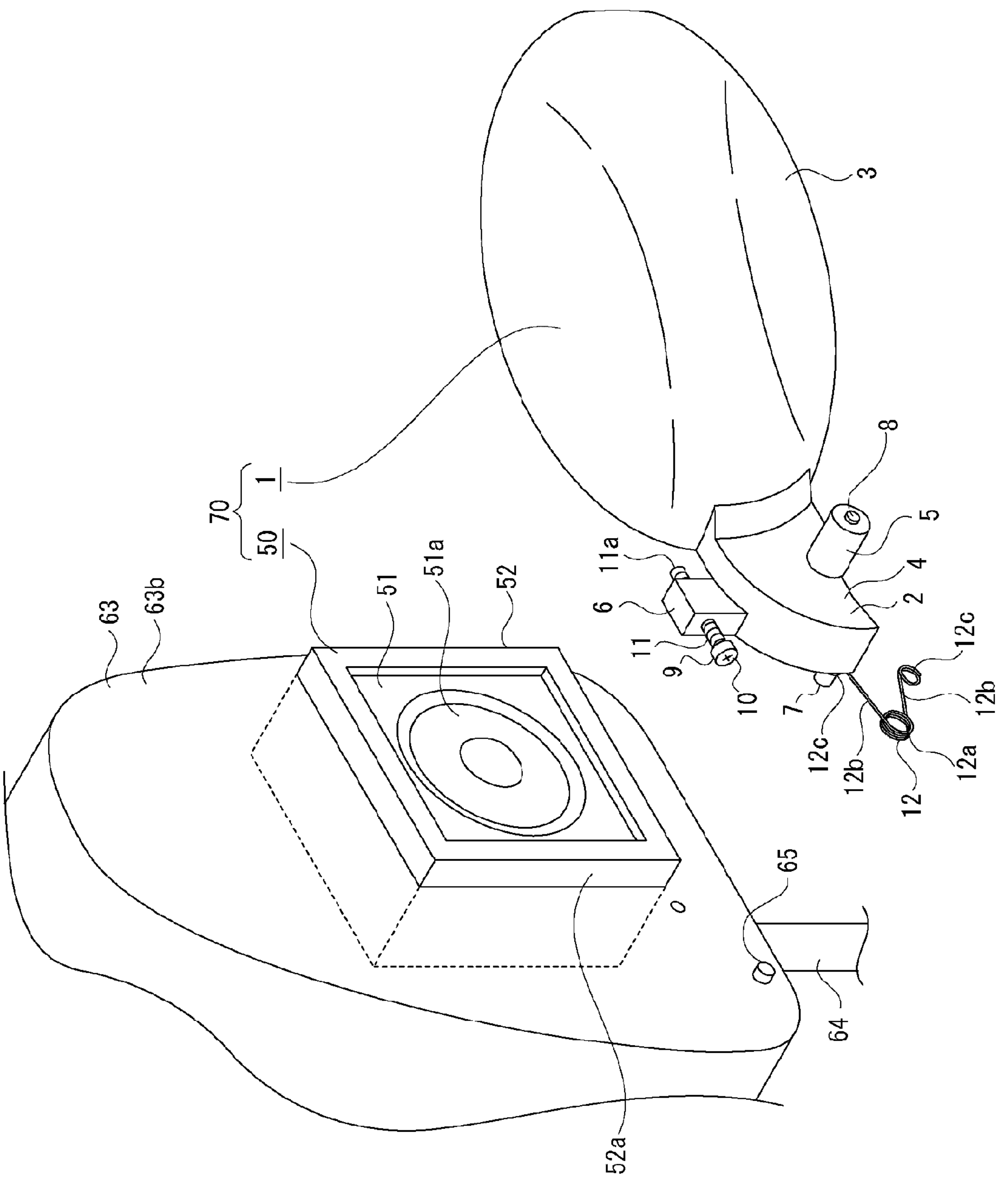
FIG. 6 is an exploded perspective view of the acoustic reflector.
Figure 7:
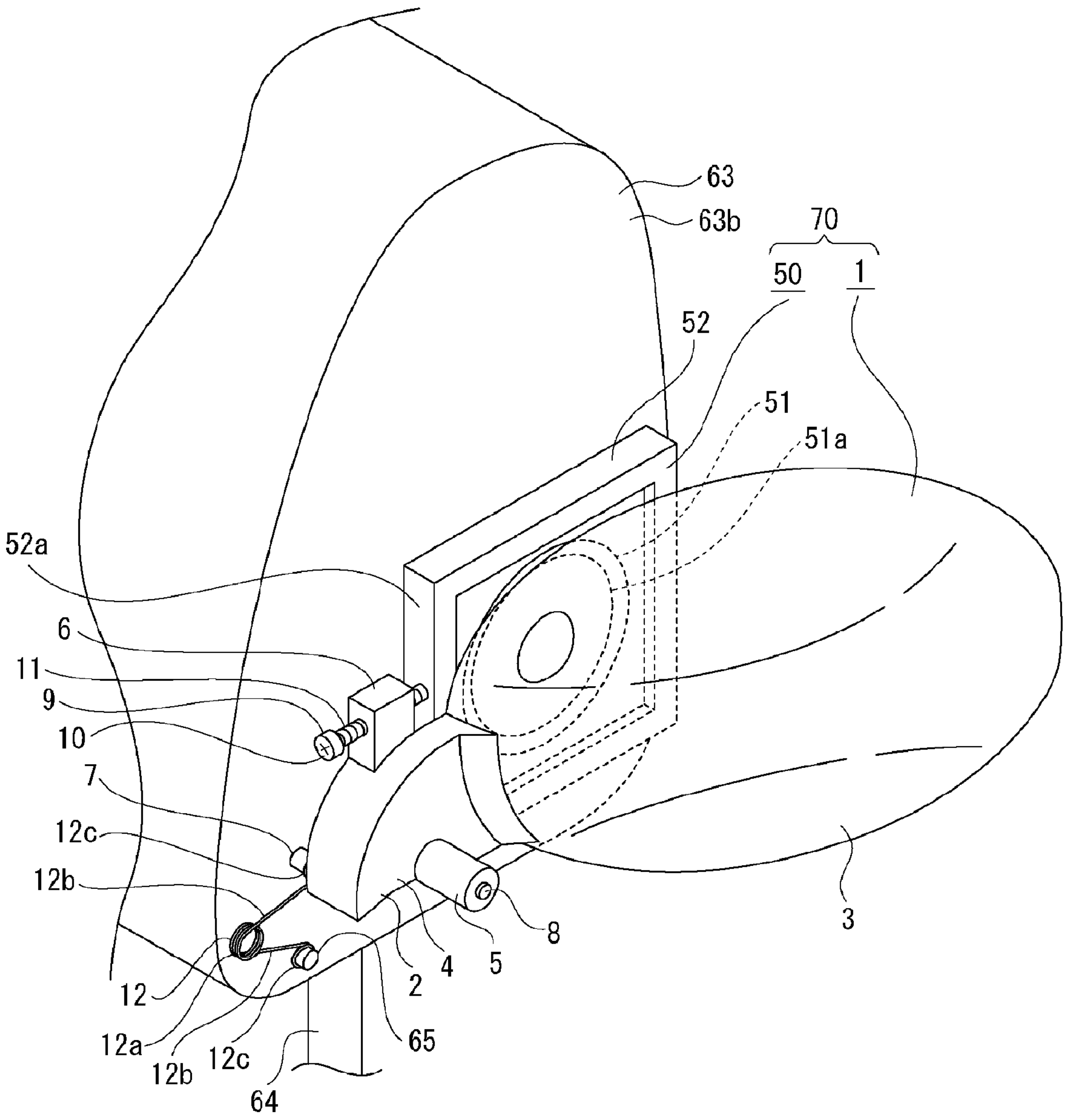
FIG. 7 is a perspective view of the acoustic reflector.

The entire acoustic reflector 1 includes, for example, a transparent resin material, and the acoustic reflector 1 includes a supported portion 2 and a reflection portion 3 (refer to FIGS. 6 and 7). Note that the acoustic reflector 1 may include an opaque material, and for example, the supported portion 2 may include an opaque material and the reflection portion 3 may include a transparent material.

The supported portion 2 includes a base portion 4 that faces right and left sides and is formed in a plate shape, a turning fulcrum portion 5 projected from the base portion 4 toward the side (outward), a screw holding portion 6 that is projected from the base portion 4 to a direction orthogonal to the turning fulcrum portion 5, and a spring support portion 7 that is projected from the base portion 4 to a direction opposite to the turning fulcrum portion 5.

The turning fulcrum portion 5 is formed in a cylindrical shape, and a fulcrum shaft 8 is inserted through the turning fulcrum portion 5 and a portion of the base portion 4 connected to the turning fulcrum portion 5. One end of the fulcrum shaft 8 is projected from the supported portion 2 toward the side (inward), and this one end is fixed in a state of being inserted into the headrest 63 from the side surface portion **63*b***.

The supported portion 2 is rotatable with respect to the fulcrum shaft 8 in a direction of a shaft rotation of the turning fulcrum portion 5. Therefore, the acoustic reflector 1 is turnably supported by the headrest 63 that functions as a support using the turning fulcrum portion 5 as a fulcrum.

An adjustment screw 9 is screwed and inserted into the screw holding portion 6, and the adjustment screw 9 functions as an adjustment member that adjusts the position of the reflection portion 3 with respect to the headrest 63. The adjustment screw 9 includes a head portion 10 having a jig groove and a screw shaft portion 11 having a screw groove, the screw shaft portion 11 is screwed into the screw holding portion 6, and the head portion 10 is positioned outside the screw holding portion 6. By rotating the adjustment screw 9 with a jig such as a driver or the like, a projection amount of the screw shaft portion 11 from the screw holding portion 6 is changed. Regarding the adjustment screw 9, a front end 11*a* of the screw shaft portion 11 is pressed against the receiving surface 52*a* of the frame 52 of the speaker device 50 at a predetermined position of turning positions of the acoustic reflector 1.

A biasing spring 12 is supported by the spring support portion 7, and for example, a toggle spring (torsion coil spring) is used as the biasing spring 12. The biasing spring 12 includes a coil portion 12*a*, a pair of arm portions 12*b* and 12*b*, and a pair of hooking portions 12*c* and 12*c*, and the arm portions 12*b* and 12*b* are respectively provided between the coil portion 12*a* and the hooking portions 12*c* and 12*c*.

In the biasing spring 12, one hooking portion 12*c* is supported by the spring hanging shaft 65 of the headrest 63, and the other hooking portion 12*c* is supported by the spring support portion 7 of the acoustic reflector 1. Therefore, a biasing force in a direction in which the arm portions 12*b* and 12*b* are separated from each other is applied to the acoustic reflector 1 by the biasing spring 12.

The reflection portion 3 is provided to be connected to an end edge of the supported portion 2 on the opposite side to the spring support portion 7. The reflection portion 3 is formed in a recessed ellipsoid on the side of the headrest 63 in the lateral direction, and an inner surface that is a surface facing the side of the headrest 63 is formed as an elliptical reflection surface 13.

Figure 8:
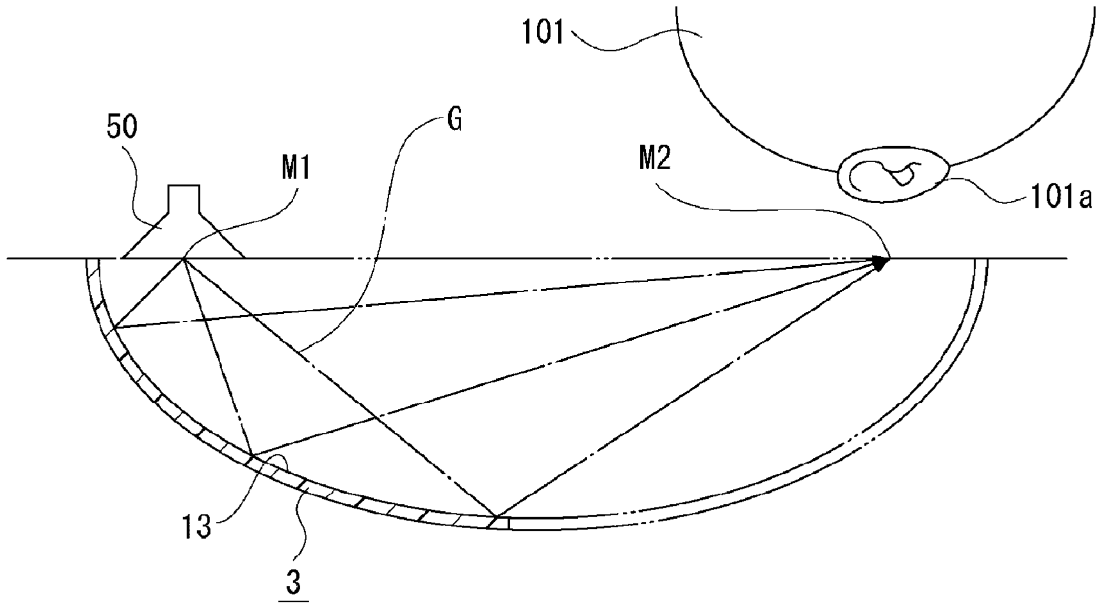
FIG. 8 is a diagram for explaining the directional angle of the speaker device and a size of a reflection portion.
Figure 9:
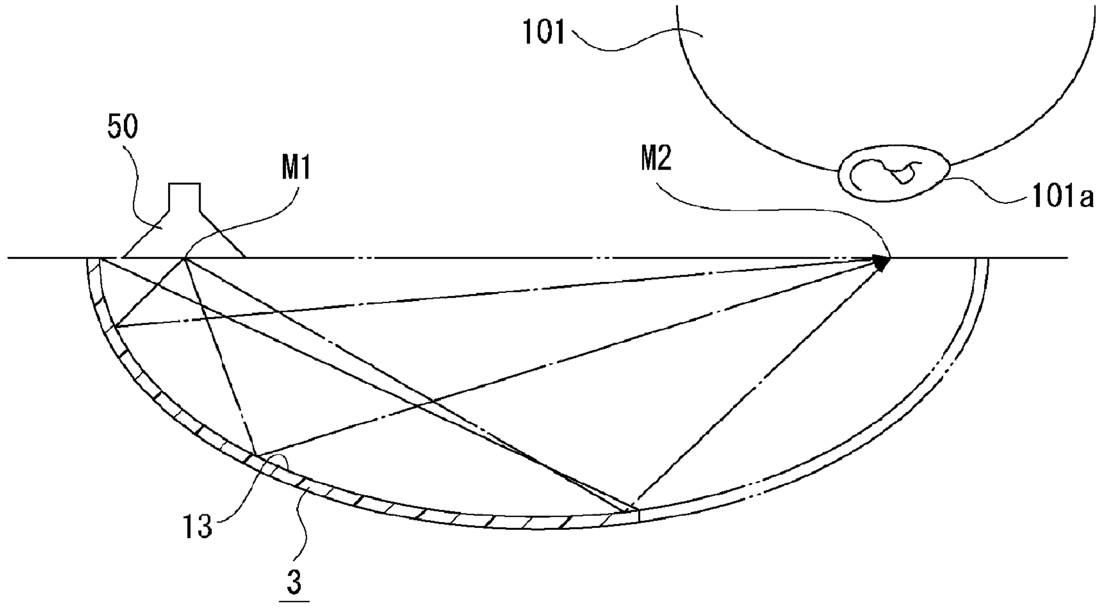
FIG. 9 is a diagram illustrating a size of the reflection portion in an example in which a speaker device having a directional angle of 120 degrees is used.
Figure 10:
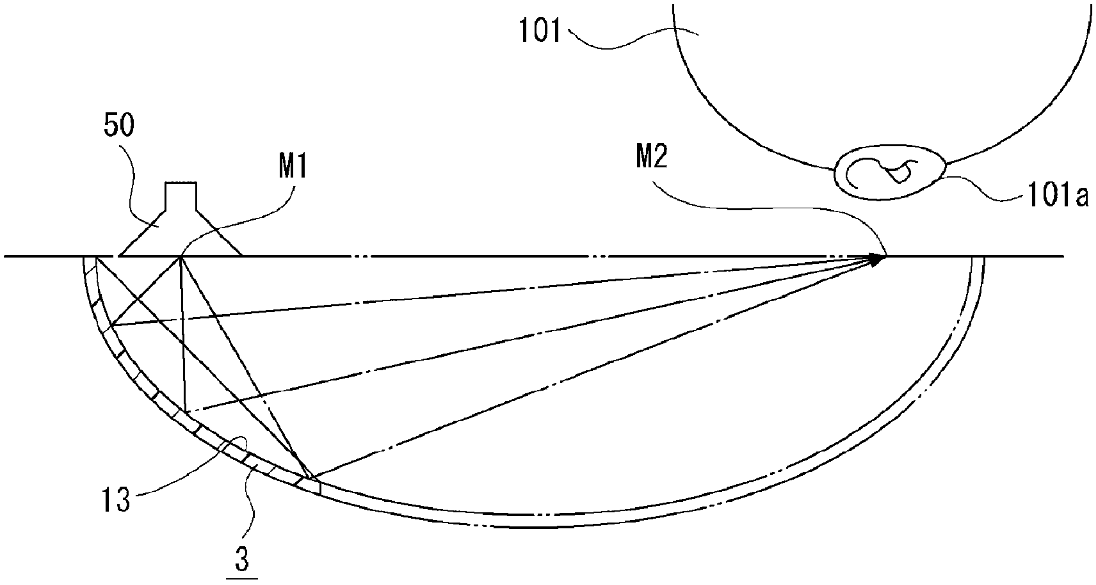
FIG. 10 is a diagram illustrating a size of the reflection portion in an example in which a speaker device having a directional angle of 60 degrees is used.
Figure 11:
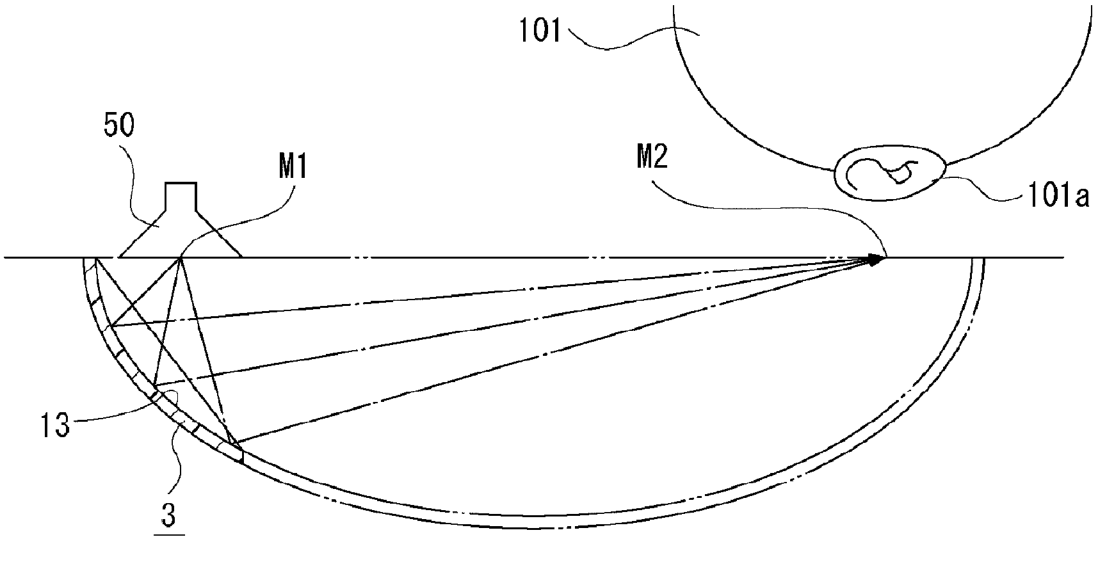
FIG. 11 is a diagram illustrating a size of the reflection portion in an example in which a speaker device having a directional angle of 30 degrees is used.

The reflection portion 3 is formed in a shape smaller than a semi-ellipsoid (refer to FIG. 8). The semi-ellipsoid is a shape that can reflect sound in a range in which a directional angle is 180 degrees in a case where an output position of sound exists at one focal point. However, the reflection portion 3 has a size to reflect sound by the elliptical reflection surface 13 in a range of equal to or less than the nominal directional angle and is formed in a shape smaller than the semi-ellipsoid. In FIG. 8, a shape indicated by an alternate long and two short dashes line indicates an outer shape of the semi-ellipsoid and a shape of the elliptical reflection surface of the semi-ellipsoid, and the reflection portion 3 is formed in a shape indicated by a solid line. For example, the elliptical reflection surface 13 can reflect sound in a range in which the directional angle is 90 degrees. An output position of sound exists at one focal point M1 of the reflection portion 3, and the sound output from the output position is reflected by the elliptical reflection surface 13, is collected to another focal point M2, and reaches an ear 101*a* of the user 100. In FIG. 8, an arrow G indicates a sound reflection state in a case where a directional angle is 90 degrees.

In this way, the reflection portion 3 has a size that reflects the sound output from the speaker device 50 in a range in which the directional angle is equal to or less than the nominal directional angle A and is smaller than the size of the semi-ellipsoid. Therefore, in the above, an example of the reflection portion 3 that has a size corresponding to the range in which the directional angle is 90 degrees. However, for example, in a case where the directional angle is 120 degrees, the reflection portion 3 has a size corresponding to the range in which the directional angle is 120 degrees (refer to FIG. 9). Furthermore, it is sufficient that the reflection portion 3 correspond to the range of equal to or less than the nominal directional angle A. For example, in a case where the nominal directional angle A is 120 degrees, the reflection portion 3 may be formed in a size corresponding to the range in which a directional angle is smaller than 120 degrees. For example, the reflection portion 3 may be formed in a size corresponding to the range of the effective directional angle B that is smaller than the nominal directional angle A or a size corresponding to the range of less than the effective directional angle B.

Therefore, the reflection portion 3 can be formed in any size as long as the shape corresponds to the range of equal to or less than the nominal directional angle A. For example, the reflection portion 3 may be formed in a size corresponding to the range in which the directional angle is 60 degrees (refer to FIG. 10) or a size corresponding to the range in which the directional angle is 30 degrees (refer to FIG. 11).

<Turning Operation or the Like of Acoustic Reflector>

Next, an operation or the like of the acoustic reflector 1 will be described (refer to FIGS. 12 to 14).

The acoustic reflector 1 is rotatable with respect to the headrest 63, and is turnable between a retreat position where the acoustic reflector 1 is held when the user 100 does not use the acoustic reflector 1 and a use position where the acoustic reflector 1 is held when the user 100 listens to the sound. Note that the acoustic reflector 1 is configured to be turnable with respect to the headrest 63. However, for example, the acoustic reflector 1 may be configured to be movable with respect to the headrest 63 in the front-back direction or the like.

Figure 12:
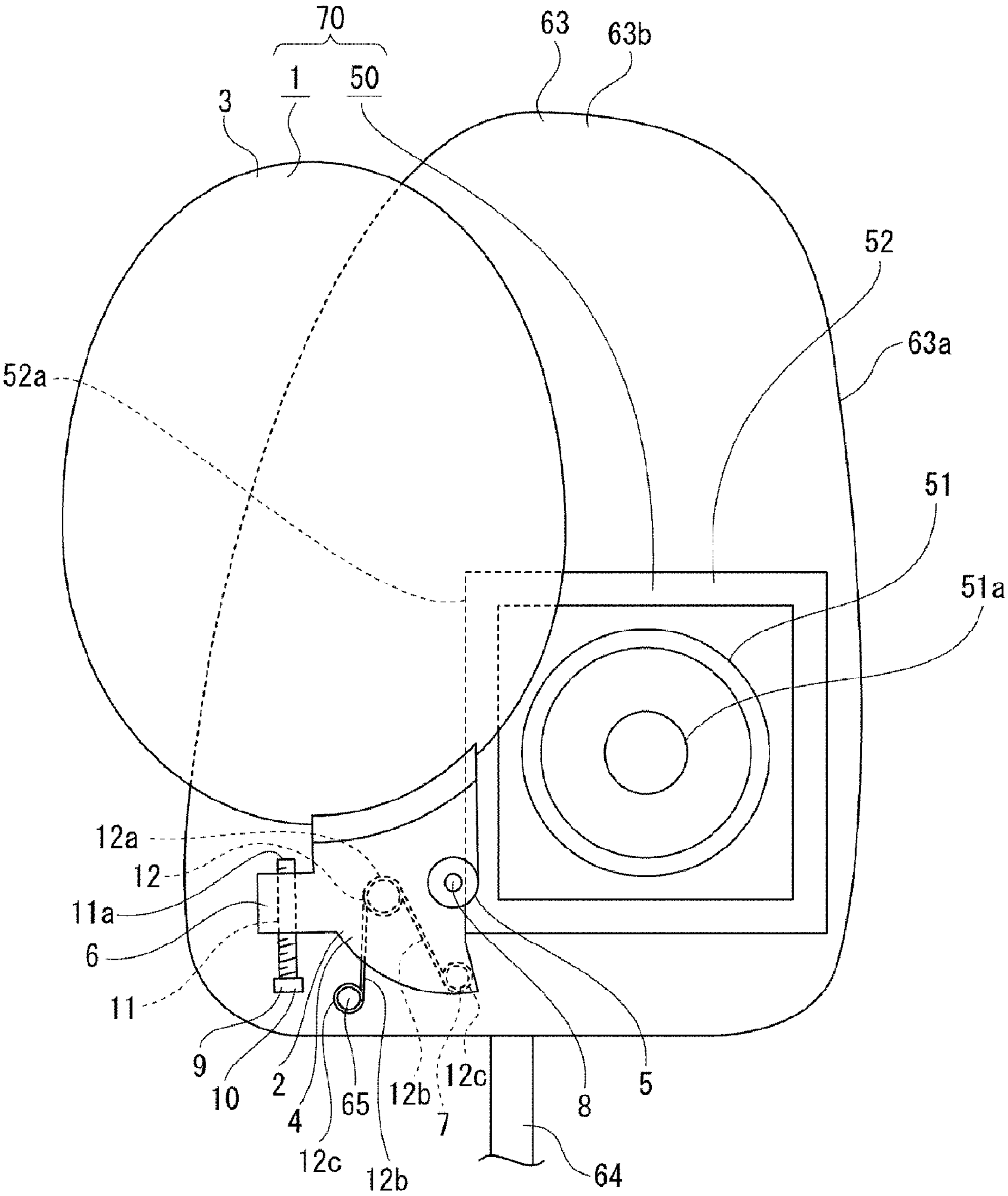
FIG. 12 is a side view illustrating a state where the acoustic reflector is positioned at a retreat position.

In a state where the acoustic reflector 1 is positioned at the retreat position, the reflection portion 3 and the supported portion 2 are substantially aligned in the vertical direction (refer to FIG. 12). At the retreat position, the spring support portion 7 is positioned on the obliquely lower and front side of a segment connecting the turning fulcrum portion 5 and the spring hanging shaft 65, the reflection portion 3 is biased by the biasing spring 12 in a direction in which the reflection portion 3 moves substantially backward, and the acoustic reflector 1 is not positioned on the front side of the headrest 63.

At the retreat position, a part of the supported portion 2 is pressed against the receiving surface 52*a* of the frame 52 of the speaker device 50 by the biasing force of the biasing spring 12, and the acoustic reflector 1 is held at the retreat position.

In a state where the acoustic reflector 1 is held at the retreat position, the acoustic reflector 1 is not positioned on the front side of the headrest 63. Therefore, when the user 100 sits on or leaves from the chair 80, when the head 101 is tilted to the left or right side in a state where the user 100 sits on the chair 80, or the like, the user 100 does not have contact with the acoustic reflector 1. Therefore, it is possible to enhance safety of the user 100, and it is possible to prevent the acoustic reflector 1 from being damaged.

Figure 13:
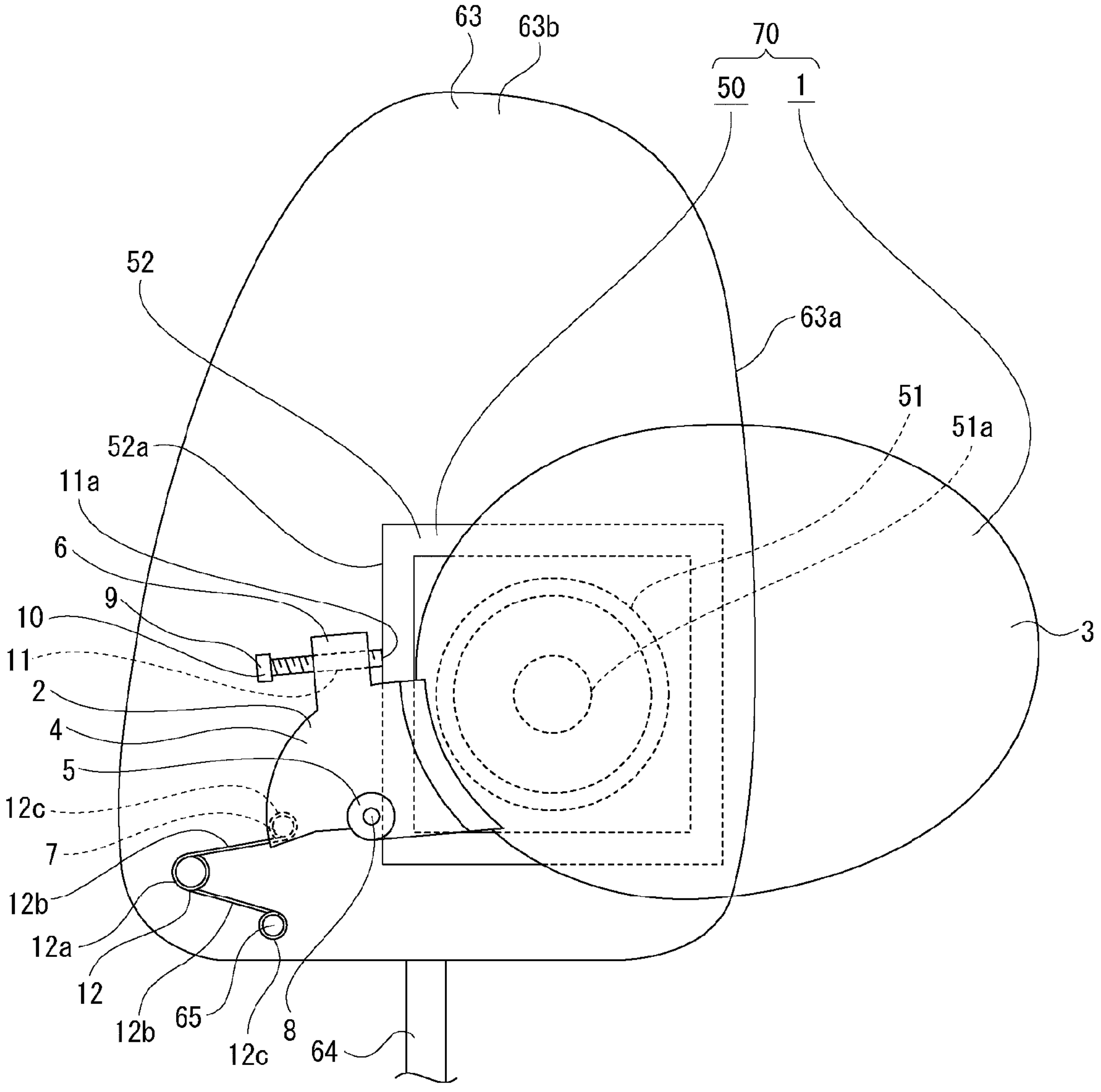
FIG. 13 is a side view illustrating a state where the acoustic reflector is positioned at a use position.
Figure 14:
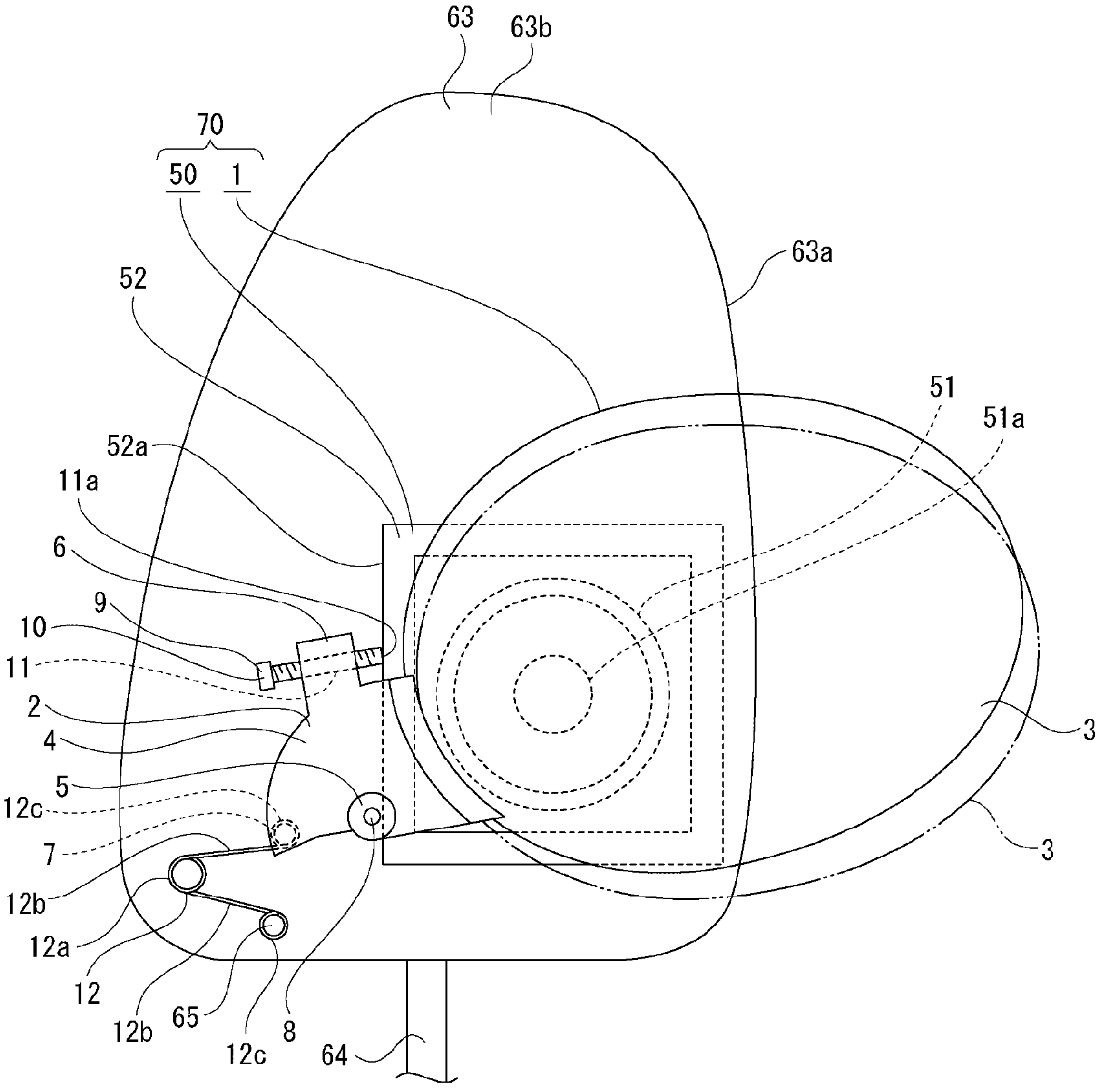
FIG. 14 is a side view illustrating a state where a position of the acoustic reflector with respect to the headrest is adjusted.

When the reflection portion 3 is pressed forward from a state where the acoustic reflector 1 is positioned at the retreat position, the acoustic reflector 1 is turned to the use position (refer to FIG. 13). At this time, the acoustic reflector 1 is turned against the biasing force of the biasing spring 12 when pressure is applied to the reflection portion 3. However, the spring support portion 7 is positioned at the obliquely upper and rear side of a segment connecting the turning fulcrum portion 5 and the spring hanging shaft 65 in the middle of turning, the direction of the biasing force applied from the biasing spring 12 to the acoustic reflector 1 is inverted in the turning direction of the acoustic reflector 1, and the reflection portion 3 is biased by the biasing spring 12 to the direction in which the reflection portion 3 moves substantially forward. Therefore, the biasing force from the retreat position toward the use position by the biasing spring 12 is applied to the acoustic reflector 1, and the acoustic reflector 1 is turned toward the use position by the biasing force of the biasing spring 12, and the front end 11*a* of the screw shaft portion 11 of the adjustment screw 9 held by the screw holding portion 6 is pressed against the receiving surface 52*a* of the frame 52 of the speaker device 50 so as to be held at the use position.

In a state where the acoustic reflector 1 is held at the use position, the reflection portion 3 and the supported portion 2 are arranged in a substantially front-back direction, and a part of the reflection portion 3 is positioned on the front side of the headrest 63.

At the use position, the output position of the speaker device 50 exists at or near the focal point (one focal point M1) on the rear side of the elliptical reflection surface 13, and the ear 101*a* of the user 100 who sits on the chair 80 is positioned on the front side of the reflection portion 3 (refer to FIG. 8). In a state where the rear head of the user 100 is placed on the headrest 63 from the front side or in a state where the rear head is positioned near the front surface of the headrest 63, the ear 101*a* is positioned at the focal point (the other focal point M2) on the front side of the elliptical reflection surface 13 or near and on the side of the focal point.

Therefore, when sound is output from the speaker device 50 that functions as a real sound source, the sound output in a range of the predetermined directional angle, for example, equal to or less than the nominal directional angle is reflected by the elliptical reflection surface 13 and is collected at the front-side focal point, and the sound collected at the front-side focal point is propagated from a virtual sound source toward the ear 101*a*.

At the use position, as described above, the front end 11*a* of the screw shaft portion 11 of the adjustment screw 9 held by the screw holding portion 6 is pressed against the receiving surface 52*a* of the frame 52 of the speaker device 50. Therefore, by changing the projection amount of the screw shaft portion 11 from the screw holding portion 6 by rotating the adjustment screw 9 with a jig such as a driver or the like, it is possible to adjust the position of the virtual sound source with respect to the ear 101*a* by adjusting the position of the reflection portion 3 with respect to the headrest 63 (refer to FIG. 14).

On the other hand, when the reflection portion 3 is pressed upward from a state where the acoustic reflector 1 is positioned at the use position, the acoustic reflector 1 is turned to the retreat position (refer to FIG. 12). At this time, the acoustic reflector 1 is turned against the biasing force of the biasing spring 12 when pressure is applied to the reflection portion 3. However, the spring support portion 7 is positioned at the obliquely lower and front side of a segment connecting the turning fulcrum portion 5 and the spring hanging shaft 65 in the middle of turning, the direction of the biasing force applied from the biasing spring 12 to the acoustic reflector 1 is inverted in the turning direction of the acoustic reflector 1, and the reflection portion 3 is biased by the biasing spring 12 to the direction in which the reflection portion 3 moves substantially backward. Therefore, the biasing force from the use position toward the retreat position by the biasing spring 12 is applied to the acoustic reflector 1, and the acoustic reflector 1 is turned to the retreat position by the biasing force of the biasing spring 12.

<Modification of Reflection Portion>

Figure 15:
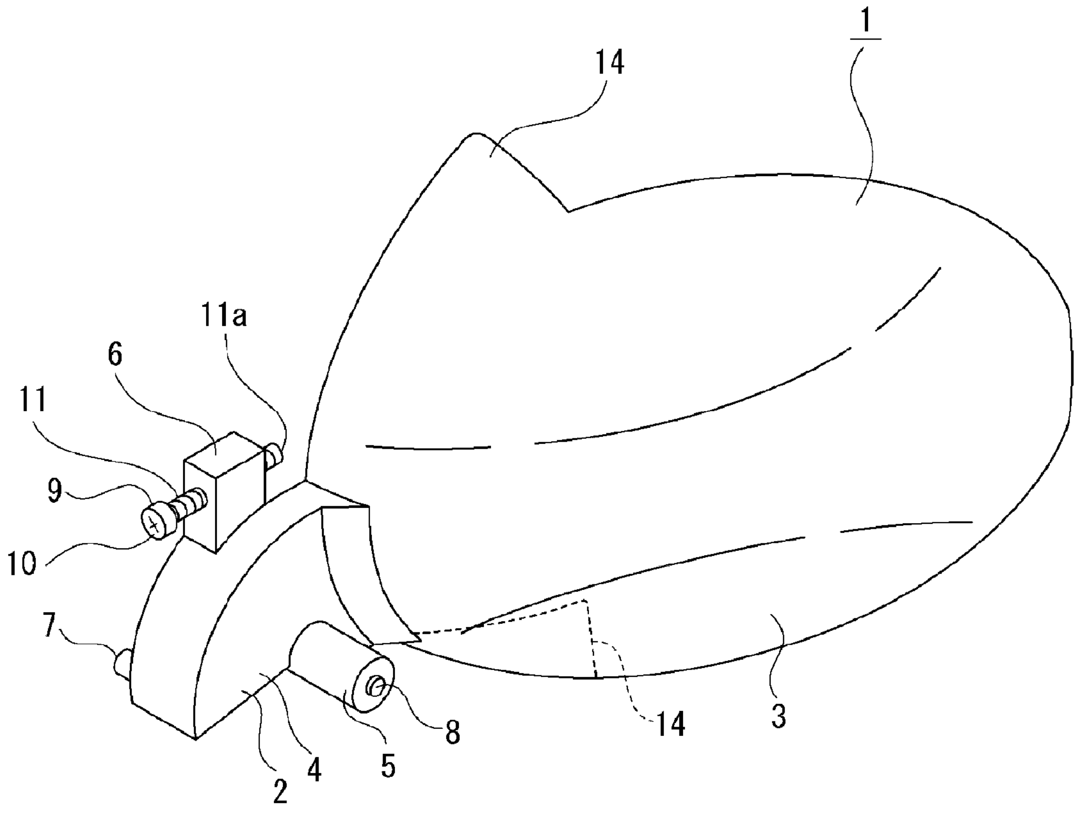
FIG. 15 is a perspective view illustrating a modification of the reflection portion.

The reflection portion 3 may include a reinforcing portion, and for example, reinforcing portions 14 and 14 may be provided that are projected from the end of the reflection portion 3 on the side of the supported portion 2 toward a direction in which the reinforcing portions 14 and 14 are separated from each other (refer to FIG. 15). The reflection portion 3 has the configuration including the reinforcing portions 14 and 14, and this increases the strength of the reflection portion 3, and it is possible to prevent breakages and damages of the reflection portion 3. Furthermore, the reflection portion 3 has the configuration including the reinforcing portions 14 and 14 so that the sound output from the speaker device 50 is reflected by the reinforcing portions 14 and 14, and sound leakage can be prevented.

Note that it is desirable that an inner surface of the reinforcing portion 14 be formed as a part of the elliptical reflection surface 13. By forming the inner surface of the reinforcing portion 14 as a part of the elliptical reflection surface 13, the area of the elliptical reflection surface 13 increases, and it is possible to increase a range where the sound output from the speaker device 50 can be reflected.

<Measurement Data or the Like>

Measurement performed on the acoustic reflector 1 will be described below (refer to FIGS. 16 and 17).

Figure 16:
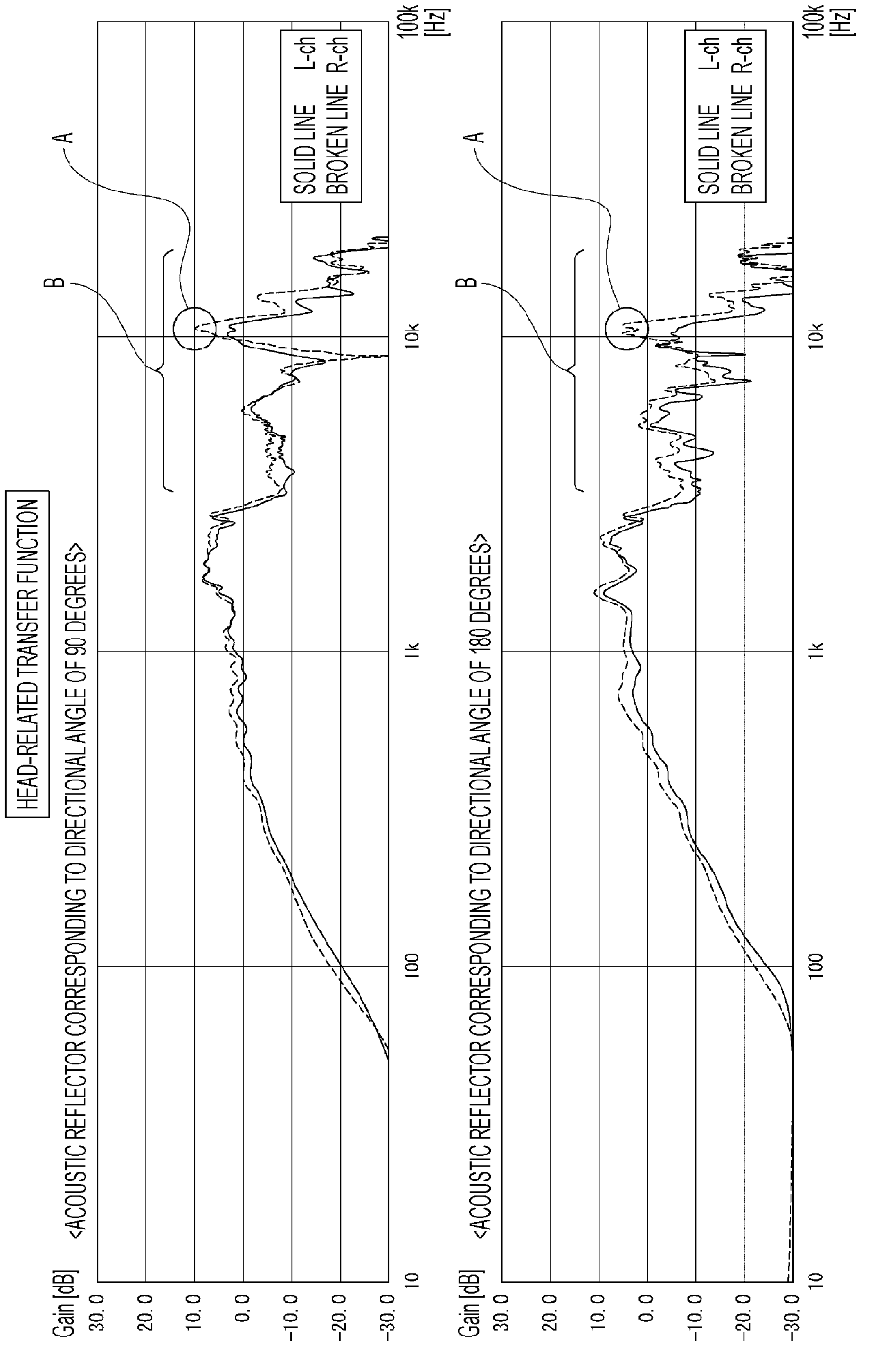
FIG. 16 is a graph illustrating measurement data regarding a head-related transfer function.

FIG. 16 is a graph obtained by measuring a head-related transfer function. The upper stage indicates measurement data regarding the acoustic reflector 1 that has a size corresponding to a range in which the directional angle is 90 degrees, and the lower stage indicates measurement data regarding an acoustic reflector (hereinafter, referred to as "acoustic reflector X") that has a size corresponding to a range in which the directional angle is 180 degrees.

The measurement was performed by each of a left channel (L-ch) and a right channel (R-ch). The horizontal axis of the graph indicates a frequency, and the vertical axis indicates a sound pressure. A solid line indicates measurement data of the left channel, and a broken line indicates measurement data of the right channel.

When data of the acoustic reflector 1 is compared with data of the acoustic reflector X, regarding the acoustic reflector 1, a substantially mountain-shaped peak value exists near A of about 10 KHz. However, regarding the acoustic reflector X, two peaks exist near the peak value of the right channel. Furthermore, regarding the acoustic reflector 1, data is represented by a smooth segment in a B region of equal to or more than five KHz. However, regarding the acoustic reflector X, a segment is more angular than the acoustic reflector 1, and unevenness (jaggedness) is conspicuous in the segment. In particular, in the acoustic reflector X, unevenness is recognized in the high frequency range and a large number of disturbances occur in the waveform as compared with the acoustic reflector 1. These disturbances are assumed to be affected by secondary reflection or tertiary reflection that is reflection by the face of the user.

As described above, as the data regarding the head-related transfer function of the acoustic reflector 1, results has been obtained such that the substantially mountain-shaped peak value exists, and the data is represented by the smooth segment, and the sound quality of the acoustic reflector 1 higher than that of the acoustic reflector X is secured.

Figure 17:
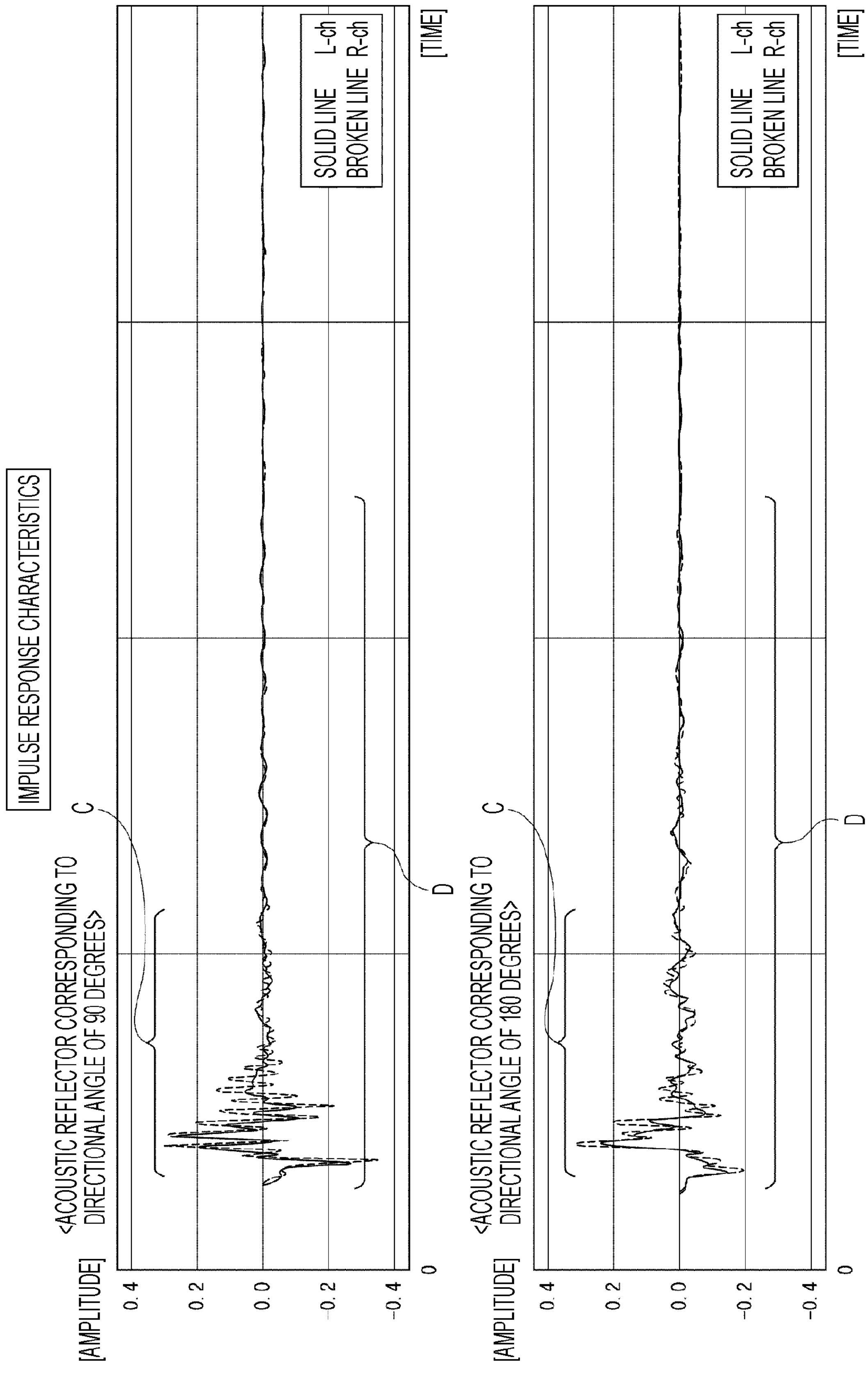
FIG. 17 is a graph illustrating measurement data regarding impulse response characteristics.

FIG. 17 is a graph obtained by measuring impulse response characteristics. The upper stage indicates measurement data regarding the acoustic reflector 1 that has a size corresponding to the range in which the directional angle is 90 degrees, and the lower stage indicates measurement data regarding the acoustic reflector X that has a size corresponding to the range in which the directional angle is 180 degrees.

The measurement was performed by each of a left channel (L-ch) and a right channel (R-ch). The horizontal axis of the graph indicates a time, and the vertical axis indicates an amplitude. A solid line indicates measurement data of the left channel, and a broken line indicates measurement data of the right channel.

When the data of the acoustic reflector 1 is compared with the data of the acoustic reflector X, in an initial time band C toward convergence, the data is gradually converged in the acoustic reflector 1. However, in the acoustic reflector X, a magnitude of an amplitude on a plus side of the acoustic reflector X and that on a minus side of the acoustic reflector X are largely biased, and regions with a large amplitude intermittently appear. Furthermore, in a time band D before the convergence, the acoustic reflector 1 has less disturbance of the amplitude. However, the acoustic reflector X has more disturbances of the amplitude than the acoustic reflector 1.

As described above, the data of the impulse response characteristics of the acoustic reflector 1 is gradually converged, and the disturbance of the amplitude is reduced. Regarding the acoustic reflector 1, a result can be obtained such that the higher sound quality than the acoustic reflector X is secured.

Furthermore, regarding the directional angle characteristics of the sound output from the speaker, measurement data obtained by measuring a sound pressure for each frequency is indicated in the known document (FIG. III-29 in ELECTRIC GUITAR & BASS SUPER MANUAL.pdf) published on the Internet. According to this known document, excellent sound characteristics can be obtained in an angle range up to 90 degrees. However, a sound pressure is largely fluctuated in an angle range exceeding 90 degrees and up to 180 degrees, and it is found that the sound characteristics are deteriorated.

As described above, as indicated in the measurement data and the known document, it is understood that, although the excellent sound can be obtained in the region in which the directional angle is equal to or less than 90 degrees, the sound quality tends to be lowered in the region in which the directional angle exceeds 90 degrees. Therefore, in the region in which the directional angle exceeds 90 degrees, the sound pressure increases as the angle becomes larger. On the other hand, as the directional angle approaches 180 degrees, sound of which the sound pressure deteriorates gradually increases, and a possibility increases that the sound quality is deteriorated.

SUMMARY

As described above, the chair 80, the speaker unit 70, and the acoustic reflector 1 include the reflection portion 3 on which the elliptical reflection surface 13 is formed, and the sound output from the speaker device 50 that has the output position of sound at or near one focal point M1 of the elliptical reflection surface 13 is reflected by the elliptical reflection surface 13, and the reflection portion 3 is formed to have a size that reflects sound in a range of equal to or less than the nominal directional angle of the speaker device 50.

Therefore, because the outer shape of the reflection portion 3 is formed to have a size of the range corresponding to the nominal directional angle of the speaker device 50, the size of the acoustic reflector 1 can be reduced.

Furthermore, the reflection portion 3 has a size that reflects sound in a range of equal to or less than the nominal directional angle of the speaker device 50, and the nominal directional angle is smaller than the directional angle of 180 degrees. Therefore, a possibility that sound of which a sound quality is deteriorated is included is reduced, and it is possible to reduce the size of the acoustic reflector 1 without deteriorating the sound quality.

Moreover, in a case where the reflection portion 3 has a size that reflects sound in a range of equal to or less than the effective directional angle, the elliptical reflection surface 13 has a size that reflects sound in a range of equal to or less than the effective directional angle that is smaller than the nominal directional angle. Therefore, it is possible to further reduce the size of the acoustic reflector 1 while securing excellent sound quality.

Moreover, the reflection portion 3 has a size that reflects sound in a range in which the directional angle is equal to or less than 90 degrees so that the reflection portion 3 has a size that reflects sound in a range of a directional angle that hardly causes distortion of the sound quality. Therefore, it is possible to reduce the size of the acoustic reflector 1 while improving the sound quality.

Furthermore, by forming the reflection portion 3 of a transparent material, a feeling of pressure of the user 100 can be reduced in a state where the acoustic reflector 1 is positioned near the head 101 when the acoustic reflector 1 is used, and it is possible to secure an excellent use state of the acoustic reflector 1.

Moreover, the acoustic reflector 1 is movable between the use position where sound output from the speaker device 50 is listened and the retreat position positioned apart from the ear 101*a* than the use position.

Therefore, it is possible to move the acoustic reflector 1 from the use position to the retreat position when sound is not listened, and it is possible to improve usability without causing the acoustic reflector 1 to interfere with the head 101 when the acoustic reflector 1 is not used.

Moreover, the acoustic reflector 1 includes the supported portion 2 that is connected to the reflection portion 3 and is supported by the headrest 63 that functions as the fulcrum, the turning fulcrum portion 5 is provided in the supported portion 2, and the supported portion 2 is turnably supported by the headrest 63 using the turning fulcrum portion 5 as a fulcrum.

Therefore, because the acoustic reflector 1 is turned so as to move between the use position and the retreat position, it is possible to easily move the acoustic reflector 1 between the use position and the retreat position at the time of use and non-use while simplifying the structure.

Furthermore, because the adjustment member that adjusts the position of the reflection portion 3 with respect to the headrest 63 at the use position is provided, it is possible to adjust the position of the reflection portion 3 with respect to the headrest 63 by the adjustment member, and it is possible to secure the an excellent sound listening state according to the position of the user 100.

Moreover, the adjustment screw 9 that is rotatably supported by the supported portion 2 is provided as the adjustment member, and the front end 11*a* of the adjustment screw 9 is pressed against a part of the speaker device 50 at the use position.

Therefore, because the position of the reflection portion 3 with respect to the headrest 63 at the use position is adjusted by pressing the front end 11*a* of the adjustment screw 9 rotated with respect to the supported portion 2 against a part of the speaker device 50, it is possible to easily and surely perform a position adjustment work of the reflection portion 3.

Moreover, the biasing spring 12 is provided that performs biasing to the direction opposite to the retreat position at the use position and performs biasing to the direction opposite to the use position at the retreat position.

Therefore, because the movement of the acoustic reflector 1 toward the retreat position is restricted by the biasing spring 12 at the use position, and the movement of the acoustic reflector 1 toward the use position is restricted by the biasing spring 12 at the retreat position. Therefore, it is possible to hold the acoustic reflector 1 at each of the use position and the retreat position while reducing the number of components.

In addition, the acoustic reflector 1 is supported by the headrest 63 of the seating portion 60 that has the headrest 63 that can be vertically moved with respect to the backrest 62 that functions as a backrest.

Therefore, by vertically moving the headrest 63 with respect to the backrest 62 according to the physical size of the user 100 who sits on the seating portion 60, it is possible to adjust the position of the acoustic reflector 1 according to the position of the user 100 with respect to the seating portion 60 and the physical size of the user 100. It is possible to secure an excellent sound listening state regardless of the position of the user 100 with respect to the seating portion 60 and the physical size of the user 100.

Furthermore, in the acoustic reflector 1, the virtual sound source is positioned near the ear 101*a*. Therefore, it is possible to hold excellent sound feeling even if the head 101 slightly moves, sound leakage is reduced, and it is possible to secure an excellent sound input state to the ear 101*a*.

<The Present Technology>

The present technology can be configured as follows.

(1)

An acoustic reflector including:

a reflection portion on which an elliptical reflection surface is formed, in which sound output from a speaker device that has an output position of the sound at or near one focal point on the elliptical reflection surface is reflected by the elliptical reflection surface, and the reflection portion has a size that reflects sound in a range of equal to or less than a nominal directional angle of the speaker device.

(2)

The acoustic reflector according to (1), in which the reflection portion has a size that reflects sound in a range of equal to or less than an effective directional angle.

(3)

The acoustic reflector according to (1) or (2), in which the reflection portion has a size that reflects sound in a range in which a directional angle is equal to or less than 90 degrees.

(4)

The acoustic reflector according to any one of (1) to (3), in which the reflection portion includes a transparent material.

(5)

The acoustic reflector according to any one of (1) to (4), in which the acoustic reflector is movable between a use position where sound output from the speaker device is listened and a retreat position positioned apart from an ear than the use position.

(6)

The acoustic reflector according to (5), further including:

a supported portion connected to the reflection portion and supported by a predetermined support, in which a turning fulcrum portion is provided in the supported portion, and the acoustic reflector is turnably supported by the support using the turning fulcrum portion as a fulcrum.

(7)

The acoustic reflector according to (6), in which an adjustment member that adjusts a position of the reflection portion with respect to the support at the use position is provided.

(8)

The acoustic reflector according to (7), in which an adjustment screw that is rotatably supported by the supported portion is provided as the adjustment member, and a front end of the adjustment screw is pressed against a part of the speaker device at the use position.

(9)

The acoustic reflector according to any one of (5) to (8), in which a biasing spring is provided that performs biasing to a direction opposite to the retreat position at the use position and performs biasing to a direction opposite to the use position at the retreat position.

(10)

The acoustic reflector according to any one of (1) to (9), in which the acoustic reflector is supported by a headrest of a seating portion that includes the headrest that is vertically movable with respect to a backrest that functions as a backrest.

(11)

A speaker unit including:

an acoustic reflector including a reflection portion on which an elliptical reflection surface is formed; and a speaker device having an output position of sound at or near one focal point on the elliptical reflection surface, in which sound output from the speaker device is reflected by the elliptical reflection surface, and the reflection portion has a size that reflects sound in a range of equal to or less than a nominal directional angle of the speaker device.

(12)

A chair including:

an acoustic reflector including a reflection portion on which an elliptical reflection surface is formed;

a speaker device having an output position of sound at or near one focal point on the elliptical reflection surface; and a seating portion to which the speaker device is attached, in which the acoustic reflector is supported by the seating portion, sound output from the speaker device is reflected by the elliptical reflection surface, and the reflection portion has a size that reflects sound in a range of equal to or less than a nominal directional angle of the speaker device.

REFERENCE SIGNS LIST

80 Chair
70 Speaker unit
60 Seating portion
62 Backrest
63 Headrest (support)
50 Speaker device
1 Acoustic reflector
2 Supported portion
3 Reflection portion
5 Turning fulcrum portion
9 Adjustment screw
11*a* Front end
12 Biasing spring
13 Elliptical reflection surface

The invention claimed is:

1. An acoustic reflector, comprising:
a reflection portion that comprises an elliptical reflection surface, wherein
a sound output from a speaker device that has an output position of the sound one of at or near one focal point on the elliptical reflection surface is reflected by the elliptical reflection surface,
a shape of the reflection portion is smaller than a semi-ellipsoid such that the reflection portion has a size that reflects the sound in a range in which a directional angle is one of equal to or less than 120 degrees, and
the acoustic reflector is movable between a use position where the sound output from the speaker device is listened and a retreat position that is positioned apart from an ear than the use position; and
a biasing spring configured to:
perform biasing of the reflection portion to a direction opposite to the retreat position at the use position; and
perform biasing of the reflection portion to a direction opposite to the use position at the retreat position.

2. The acoustic reflector according to claim 1, wherein the reflection portion has the size that reflects the sound in the range one of equal to or less than an effective directional angle.

3. The acoustic reflector according to claim 1, wherein the reflection portion includes a transparent material.

4. The acoustic reflector according to claim 1, further comprising
a supported portion connected to the reflection portion and supported by a support, wherein
the supported portion includes a turning fulcrum portion, and
the acoustic reflector is turnably supported by the support using the turning fulcrum portion as a fulcrum.

5. The acoustic reflector according to claim 4, further comprising an adjustment member configured to adjust a position of the reflection portion with respect to the support at the use position.

6. The acoustic reflector according to claim 5, wherein
the adjustment member includes an adjustment screw that is rotatably supported by the supported portion, and
a front end of the adjustment screw is pressed against a part of the speaker device at the use position.

7. The acoustic reflector according to claim 1, wherein
the acoustic reflector is supported by a headrest of a seating portion that includes the headrest, and
the headrest is vertically movable with respect to a backrest.

8. A speaker unit, comprising:
an acoustic reflector including a reflection portion, wherein the reflection portion comprises an elliptical reflection surface; and
a speaker device having an output position of a sound one of at or near one focal point on the elliptical reflection surface, wherein
the sound output from the speaker device is reflected by the elliptical reflection surface,
a shape of the reflection portion is smaller than a semi-ellipsoid such that the reflection portion has a size that reflects the sound in a range in which a directional angle is one of equal to or less than 120 degrees,
the acoustic reflector is movable between a use position where the sound output from the speaker device is listened and a retreat position that is positioned apart from an ear than the use position, and
the acoustic reflector further includes a biasing spring configured to:
perform biasing of the reflection portion to a direction opposite to the retreat position at the use position; and
perform biasing of the reflection portion to a direction opposite to the use position at the retreat position.

9. A chair, comprising:
an acoustic reflector including a reflection portion, wherein the reflection portion comprises an elliptical reflection surface;
a speaker device having an output position of a sound one of at or near one focal point on the elliptical reflection surface; and
a seating portion to which the speaker device is attached, wherein
the acoustic reflector is supported by the seating portion,
the sound output from the speaker device is reflected by the elliptical reflection surface,
a shape of the reflection portion is smaller than a semi-ellipsoid such that the reflection portion has a size that reflects the sound in a range in which a directional angle is one of equal to or less than 120 degrees,
the acoustic reflector is movable between a use position where the sound output from the speaker device is listened and a retreat position that is positioned apart from an ear than the use position, and
the acoustic reflector further includes a biasing spring configured to:
perform biasing of the reflection portion to a direction opposite to the retreat position at the use position; and
perform biasing of the reflection portion to a direction opposite to the use position at the retreat position.

* * * * *